United States Patent [19]

Houskamp et al.

[11] 4,020,918

[45] May 3, 1977

[54] MANUALLY OPERABLE AUTOMATICALLY CONTROLLED VEHICLE WITH POWER STEERING

[75] Inventors: Robert W. Houskamp; Carl DeBruine, both of Grand Rapids, Mich.

[73] Assignee: Lear Siegler, Inc., Santa Monica, Calif.

[22] Filed: Dec. 31, 1975

[21] Appl. No.: 645,710

[52] U.S. Cl. .................. 180/79.1; 180/77 HT; 180/98; 180/146
[51] Int. Cl.² ............................................ B62D 5/04
[58] Field of Search ............... 180/79.1, 19 S, 98, 180/6.5, 65 R, 141, 142, 131, 146, 77 HT

[56] References Cited

UNITED STATES PATENTS

| | | | |
|---|---|---|---|
| 2,587,377 | 2/1952 | Penrose | 180/79.1 |
| 3,557,893 | 1/1971 | Kohls | 180/79.1 X |
| 3,628,624 | 12/1971 | Wesener | 180/79.1 X |
| 3,812,929 | 5/1974 | Farque | 180/98 |

Primary Examiner—Joseph F. Peters, Jr.
Assistant Examiner—R. Schrecengost
Attorney, Agent, or Firm—McGarry & Waters

[57] ABSTRACT

An automatically controlled manually steerable vehicle has power steering in both manual and automatic control modes. A torque sensing means for the coupling between the steering handle and the steerable wheel uses a flexible coupling and a photocell detecting system to control the power steering for the vehicle in the manual mode.

7 Claims, 5 Drawing Figures

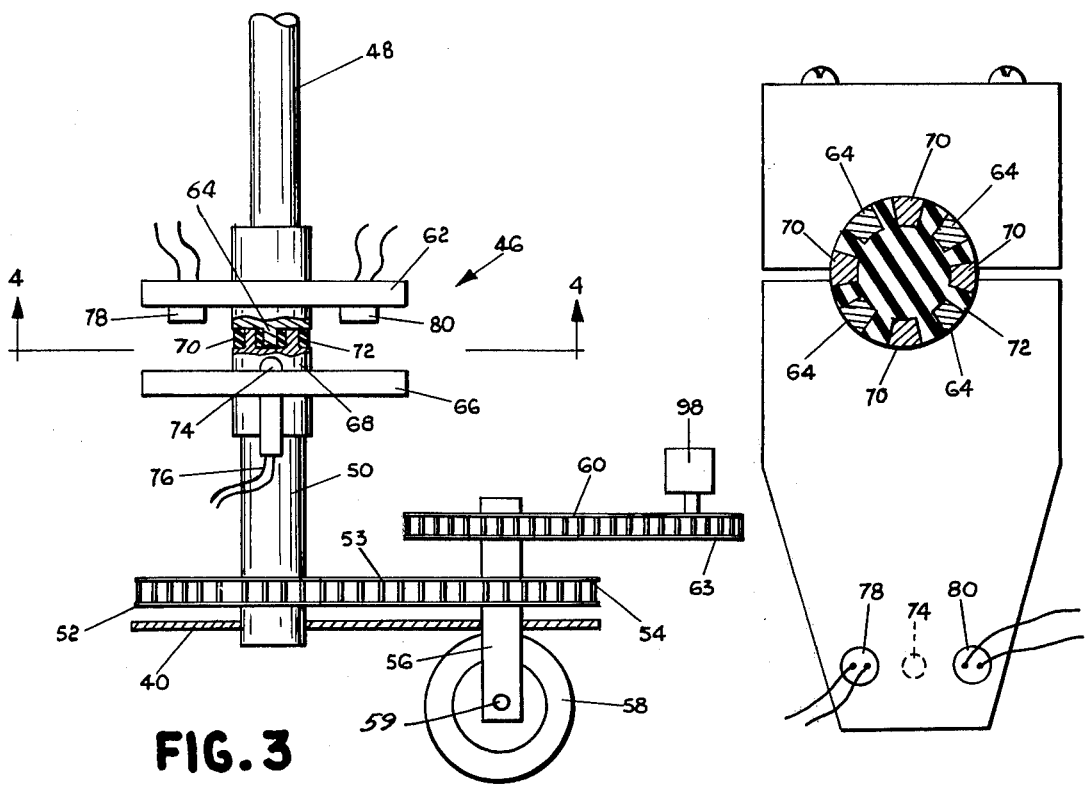
FIG. 3
FIG. 4
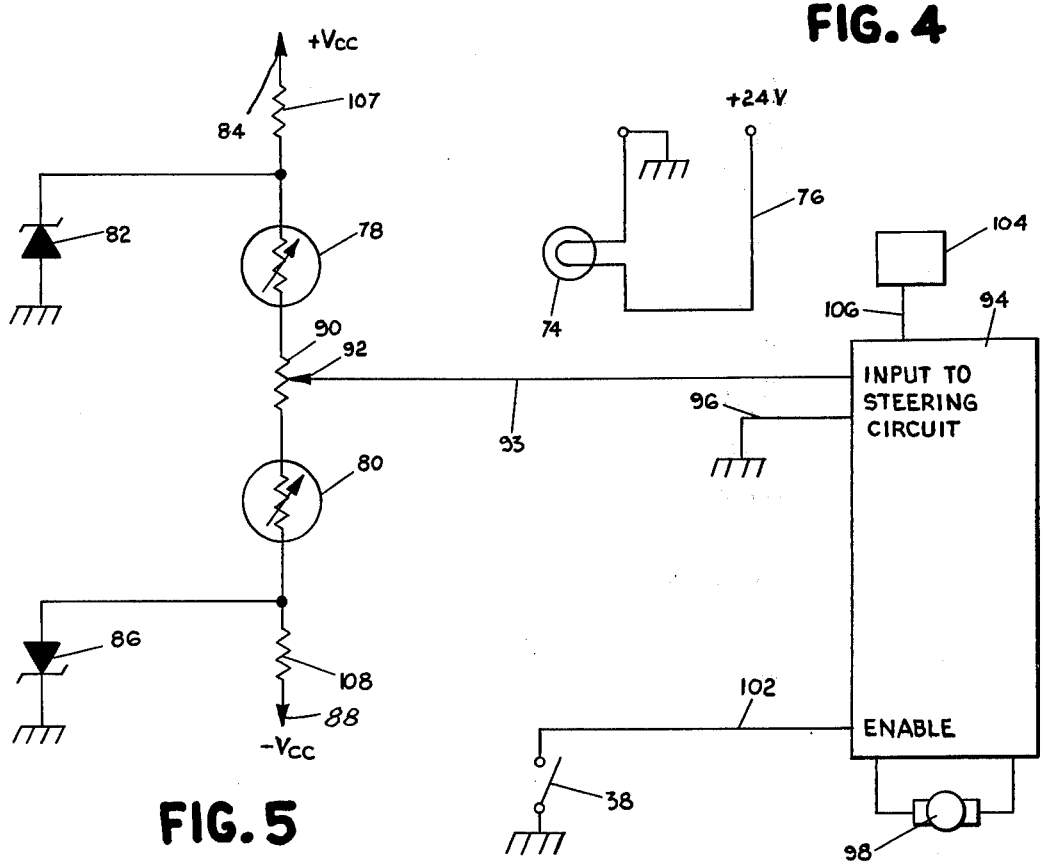
FIG. 5

MANUALLY OPERABLE AUTOMATICALLY CONTROLLED VEHICLE WITH POWER STEERING

BACKGROUND OF THE INVENTION

1. Field of the Invention

This invention relates to an automatically controlled manually steerable vehicle. In one of its aspects, the invention relates to a power steering means for manually controlling a vehicle with an automatically controlled system.

2. State of the Prior Art

Various service vehicles have been provided with automatic control so that they are driven on a predetermined guide path in a programmed manner. In such vehicles, the guide paths, such as reflected guide lines or electrically detectable guide wires are positioned on or in the floor. For example, in U.S. Pat. No. 3,628,624 to Wesener, issued Dec. 21, 1971, a vehicle which follows a predetermined guide path has a control panel at the front end of the vehicle for presetting a reader to respond to code markings along the guide path.

An automatically controlled vehicle with a manual control mode is disclosed in the U.S. Pat. to Kohls, 3,557,893, issued Jan. 26, 1971. In the Kohls vehicle, a tiller, pivotably mounted on a vertical steering shaft, is biased to a normally inoperative vertical position. Movement of a tiller downwardly to a horizontal operative position deactivates the automatic steering system, disconnects the steering servomotor, and activates a control unit operated by the handle on the tiller for propulsion regulation and steering of the vehicle. The Kohls system thus has a completely manual steering system which might be somewhat difficult when the vehicle is heavily loaded and traveling on carpeted surfaces.

SUMMARY OF THE INVENTION

According to the invention, a power steering system is provided for an automatically, manually steerable vehicle. A steerable wheel and a servo means for power steering the steerable wheel are provided in the vehicle. The automatically controlled system for the vehicle includes a means for detecting a sensible guide line and a first circuit means for applying a steering signal in the servomotor responsive to deviation of the vehicle from the sensible line. A manually operable steering element is coupled to the steerable wheel for manually steering the steerable wheel. A switch means is provided for disabling the first circuit means for manual steering of the vehicle.

According to the invention, a torque sensing means on the steering element coupling detects the application of torque thereto and generates an output signal representative of the direction of torque on the steering element coupling means. Second circuit means are provided for driving the servomotor responsive to the output signal from the torque sensing means so as to null the signal from the torque sensing means.

The steering element coupling comprises first and second plates separated by a flexible coupling and the torque sensing means preferably comprise means to detect relative movement between the first and second plates with respect to an axis passing through the plates. In a preferred embodiment of the invention, the relative movement detecting means comprise photocells on one plate and a light source on the other plate. Desirably, a pair of photocells are spaced from each other on one plate and equally spaced from the light source so that movement of the light source with respect to the photocells cause an imbalance in the photocell output.

In a preferred embodiment of the invention, the steering element is positioned behind a door in the vehicle and switch means are activated by the door, the switch means being coupled to the first circuit means for disabling the first circuit means upon opening of the door.

BRIEF DESCRIPTION OF THE DRAWINGS

The invention will now be described with reference to the accompanying drawings in which:

FIG. 3 is a schematic partial view of the steering control according to the invention;

FIG. 4 is a schematic view taken along lines 4—4 of FIG. 3; and

FIG. 5 is a schematic diagram of an electrical system used for steering the vehicle.

DESCRIPTION OF THE PREFERRED EMBODIMENT

Figure 1:
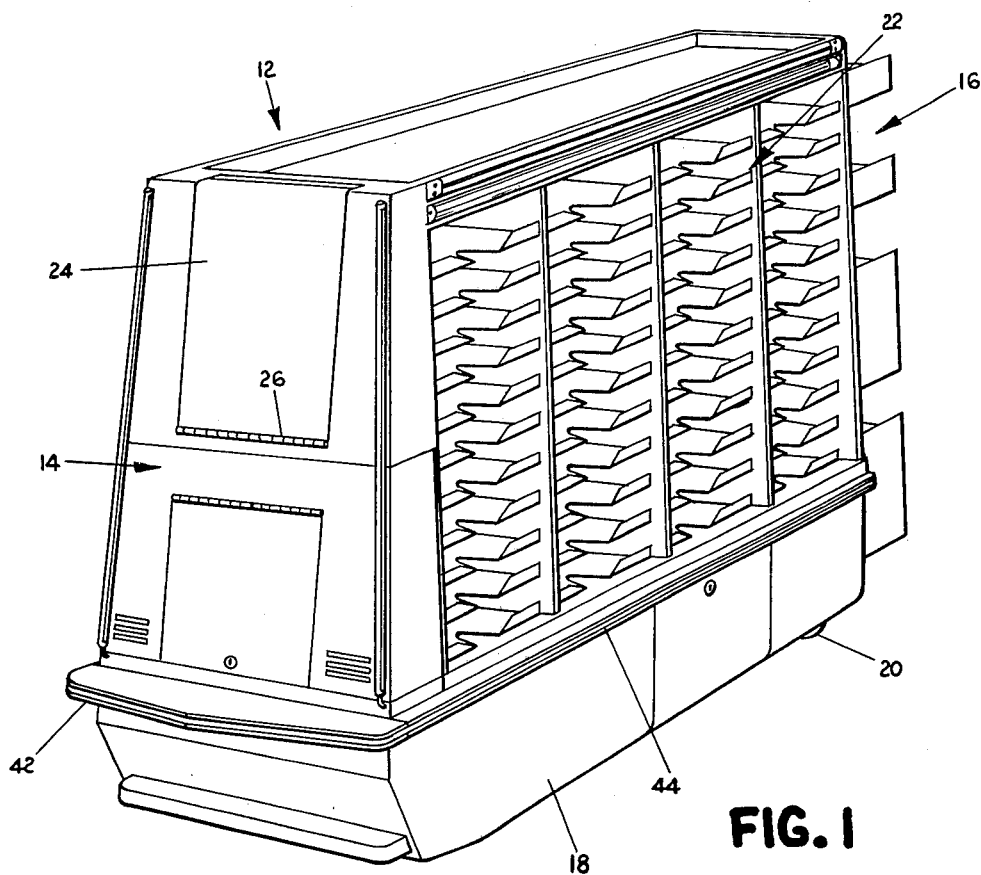
FIG. 1 is a perspective view of a vehicle according to the invention.

Referring now to the drawings, and to FIG. 1 in particular, there is shown a delivery vehicle 12, for delivering mail, for example. The vehicle has a front end 14, a back end 16, and sides 18. Rear wheels 20 and a single steerable and driven wheel 58 (shown in FIG. 3) at the front of the vehicle, support the vehicle for movement along a surface. The vehicle has a plurality of mail shelves 22 in which various items may be placed for delivery by the vehicle.

Normally, the vehicle will track an invisible line, such as a line containing material which fluoresces when irradiated by ultraviolet light. To this end, the vehicle has a tracking system as, for example, disclosed in claimed and commonly assigned U.S. patent application of Jack A. Cooper and Carl DeBruine, Ser. No. 489,043, filed July 16, 1974 now U.S. Pat. No. 3,935,922, and entitled VEHICLE CONTROL MECHANISM. The disclosure of this application is incorporated herein by reference.

The vehicle thus normally follows a predetermined path automatically and is programmed to stop for timed intervals at preselected locations. After the timed stops, the vehicle will then continue along the preselected path until it comes to another stopping place. The automatic control features and the program control of the vehicle form no part of this invention.

Figure 2:
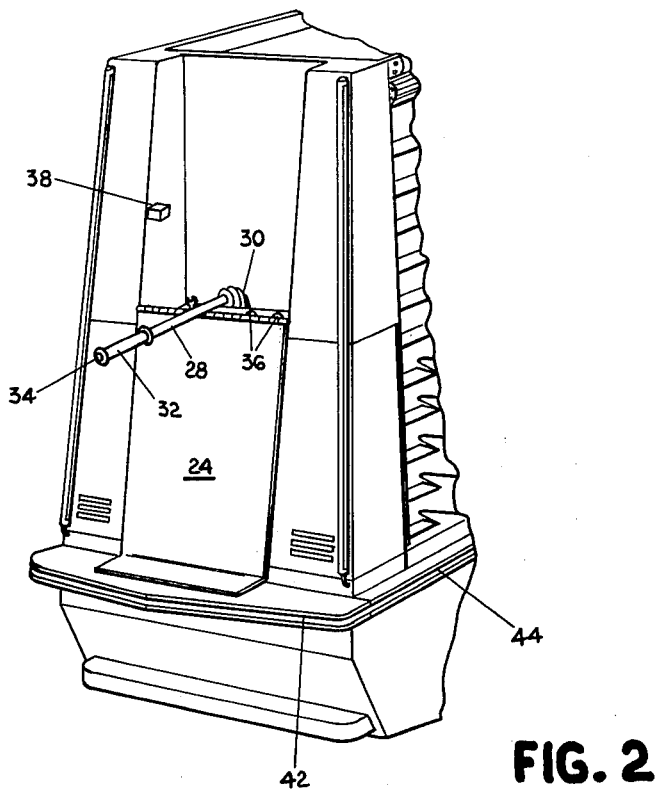
FIG. 2 is a partial view, like FIG. 1, showing an access door open and tiller handle pulled downwardly.

Occasionally, it is desirable to disengage the automatic control and to manually operate the vehicle. For this purpose, a door 24 is provided at the front of the vehicle on hinge 26. As illustrated in FIG. 2, the front door 24 rotates downwardly on hinge 26 to expose a pivotably mounted tiller handle 28. The handle 28 is pivotably mounted on a steering shaft 48 (FIG. 3) and is biased in a vertically upright position by a spring (not shown). The handle 28 is connected directly to the front steerable wheel through a connection which will be described later so that upon rotation of the tiller handle 28 about the axis of the steering shaft 48, the steerable wheel will be rotated about its mounting shaft.

The tiller handle 28 is connected to the steering shaft 48 through a hinge coupling 30. A normally open microswitch 38 is positioned on the vehicle adjacent to the door 24 so that the switch closes when the door is open. The switch 38 is connected to a control circuit to disengage the automatic steering control as the door is opened.

A handle control 32 with a speed control button 34 is provided on the outer end of handle 28. Additional controls 36 are provided inside the front door 24 for starting and stopping the vehicle as desired. Controls are provided in the handle control 32 such that when the handle control is pulled forwardly, the vehicle will be driven in a forward direction. Further, when the handle control 32 is pushed back toward the vehicle, the vehicle is driven rearwardly. The speed control button 34 causes the vehicle to go at a higher speed when the button is depressed.

The tracking unit (not shown in FIGS. 1 or 2) is provided beneath the vehicle for tracking the invisible line and for automatically guiding the direction of the vehicle. The tracking unit also detects control signals to control the stopping of the vehicle.

The vehicle 12 has a front bumper 42 and a side bumper 44 which contain pressure sensitive switches for stopping the vehicle when the vehicle contacts an abutment. The pressure sensitive switch (not shown) in the bumper disengages the automatic control for the vehicle and causes the vehicle to stop when the switch is closed.

Reference is now made to FIGS. 3 and 4 for a description of the coupling between the steering shaft 48 and the steerable wheel 58. A flexible coupling 46 is provided between the steering shaft 48 and a vertically disposed shaft 50. The steerable wheel 58 is mounted on a forked pivot shaft 56 through an axle 59. The forked pivot shaft 56 is journaled in a bottom frame portion 40 of the vehicle and is coupled to the vertical shaft 50 through a sprocket 54 on shaft 56, a chain 53 and a sprocket 52 on shaft 50. Thus, rotational movement of the shaft 50 will cause a corresponding or proportional movement of the forked pivot shaft 56 to provide a steering control for the vehicle.

A drive sprocket 60 is also secured to the pivot shaft 56. Sprocket 60 is connected to a servomotor 98 through chain 61 and sprocket 63. Thus, motor 98 drives the forked pivot shaft 56 to steer the vehicle through sprocket 63, chain 61 and sprocket 60.

The flexible coupling 46 comprises a top plate 62 which is secured to the steering shaft 48. The top plate 62 has a hub with a plurality of downwardly projecting teeth 64. A bottom plate 66 is secured to the vertical shaft 50 and has a hub 68 with a plurality of upwardly projecting teeth 70 which are positioned between the downwardly projecting teeth 64 of the plate 62. A resilient compressible coupling 72 is provided between the downwardly projecting teeth 64 of top plate 62 and the upwardly projecting teeth 70 of the bottom plate 66. The resilient compressible coupling permits the top plate 62 to be canted somewhat with respect to the bottom plate 66 while maintaining the connection between the shaft 48 and the vertical shaft 50.

Due to the compressible coupling 72 between the teeth 70 and 64, the hubs of top plate 62 and bottom plate 66 are thus in direct and continuous mechanical connection, yet may have relative motion due to the compressibility of coupling 72. According to the invention, this compressibility of the coupling 72 is used to control a power steering mechanism for the steerable wheel. The plates 62 and 66 are elongated in shape, with top plates 62 being shown in FIG. 4. A light source 74 is mounted near one end of plate 66. Mounted above the light source 74 on plate 62 are photocells 78 and 80. The photocells are spaced apart from each other and equidistant from the light source 74, the projection of which onto the plate 62 is shown in phantom lines and designated with the numeral 74 in FIG. 4. Thus, when the steering shaft 48 and the vertical shaft 50 are aligned with one another so that there is no torque applied to the flexible coupling 46, the light from the light source 74 will radiate equally on the photocells 78 and 80. However, when a torque is applied to the coupling 46, for example, by rotating the tiller handle 28, the plate 62 will rotate slightly with respect to plate 66. Thus, more light will be detected by photocell 78 or 80 (depending on the direction of rotation of the steering shaft 48). The photocells 78 and 80 are connected to a steering control, which will be described later, to control the servomotor 98 to rotate the steerable wheel 58 in such a manner so as to overcome the torque applied to the shaft 48. As the shaft 56 rotates, the vertical shaft 50 will rotate to return the plate 66 to an aligned position with respect to the plate 62.

The control circuit for operating the power steering system according to the invention is illustrated in FIG. 5 to which reference is now made. A positive voltage source 84 is connected to the photocell 78 which is established by Zener diode 82 and resistance 107. Similarly, a negative voltage source 88 is connected to the photocell 80 which is established by Zener diode 86 and resistance 108. The photocells 78 and 80 are connected to an electrical zero adjusting slide wire resistance 90. A tap 92 is connected to the resistance wire 90 at a zero electrical potential when equal amounts of light are detected by the photocells 78 and 80, and when there is a zero torque on the flexible coupling 46. The tap 92, which is adjustable to compensate for minor photocell misalignments, is connected to a control circuit 94 through a lead 93. The control circuit 94 receives an input signal from lead 93 and is adapted to drive the servomotor 98 depending on the polarity of the input signal from the tap 92. The chassis grounded lead 96 is provided to the control circuit 94 to reference the signal from tap 92. The control circuit 94 is also connected through a lead 106 to a sensing unit 104 which detects the deviation of the vehicle from a guide line. The control circuit 94 is also adapted to drive motor 98 responsive to an input error signal from the sensing unit 104. A suitable control circuit is disclosed in the aforementioned patent application of Cooper and DeBruine, Ser. No. 489,043 now U.S. Pat. No. 3,935,922. The switch 38 is connected to the control circuit 94 through lead 102. The control circuit has gating means (not shown) for disabling the signal from the sensing unit 104 when switch 38 is closed. At the same time, the gating signal will make the control system responsive to the signal from the tap 92. The light source 74 is illuminated from a power source lead 76.

In operation, the vehicle will normally operate to automatically follow a guide line. The sensing unit 104 will apply a signal to the control circuit 94 which drives the servomotor 98 to steer the wheel 58. When it is desirable to manually control the vehicle, the door 24 is opened, thereby closing switch 38 and disabling the automatic control from the sensing unit 104. When the tiller handle 28 is pulled downwardly, as illustrated in FIG. 2, and the tiller handle is rotated about the axis of steering shaft 48, a torque will be applied to the flexible coupling 46. Due to the flexible nature of the coupling 72 between the teeth 64 and 70, plate 62 will rotate slightly with respect to plate 66, thereby irradiating one of the photocells 78 and 80 to a greater degree than the other. Consequently, an imbalance will occur at tap 92 and a positive or negative signal will be applied to the control circuit 94. Responsive thereto, the control circuit 94 will drive motor 98 to turn the wheel 58 on the forked pivot shaft 56. As a result of the rotation of shaft 56, shaft 50 will turn and continue to turn until the torque in the flexible coupling 46 is dissipated. At such time, the light detected by photocells 78 and 80 will be equal and the signal at the tap 92 will be nulled.

By use of the invention, the power driven steering control of the vehicle which is normally used for automatically controlling the vehicle is used for power steering of the vehicle.

Thus, the automatic steering control is disengaged and the manual steering control operates through the power steering device to steer the vehicle.

Reasonable variation and modification are possible within the scope of the foregoing disclosure and drawings without departing from the spirit of the invention which is defined in the accompanying claims.

The embodiments of the invention in which an exclusive property or privilege is claimed are defined as follows:

1. In an automatically controlled, manually steerable vehicle having a steerable wheel and servo means for power steering said steerable wheel;
    means for detecting a sensible guide line;
    first circuit means for applying a steering signal to said servomotor responsive to deviation of the vehicle from the sensible line;
    a manually operable steering element;
    means coupling the steering element to the steerable wheel for manually steering the steerable wheel; and
    switch means for disabling the first circuit means for manual steering of the vehicle;
    the improvement which comprises:
    torque sensing means on said steering element coupling means for detecting application of torque thereto and for generating an output signal representative of the direction of torque on the steering element coupling means; and
    second circuit means for driving said servo means responsive to the output signal from the torgue sensing means so as to null the signal from the torque sensing means.

2. An automatically controlled manually steerable vehicle according to claim 1 wherein the steering element coupling means comprises first and second plates separated by a flexible coupling; and said torque sensing means comprises means to detect relative movement between the first and second plates with respect to an axis passing through one plate.

3. An automatically controlled, manually steerable vehicle according to claim 2 wherein the relative movement detecting means comprises photocell means on one plate and a light source on the other plate.

4. An automatically controlled manually steerable vehicle according to claim 3 wherein the photocell means comprises a pair of photocells spaced from each other and equally spaced from the light source.

5. An automatically controlled, manually steerable vehicle according to claim 4 wherein the steering element is positioned behind a door in the vehicle and a switch means is actuated by opening of the door so that the switch means disengages the first circuit means upon opening of the door.

6. An automatically controlled, manually steerable vehicle according to claim 4 wherein the coupling means further comprises:
    a first shaft connected to said steering element, said first plate being mounted generally perpendicular to and on an end of the first shaft;
    a second shaft connected to the steerable wheel, said second shaft mounting the second plate generally perpendicular to the second shaft on an end thereof; and
    said second shaft being generally aligned with respect to the first shaft.

7. An automatically controlled, manually steerable vehicle according to claim 1 wherein the steering element is positioned behind a door in the vehicle and the switch means is actuated by opening of the door so that the switch means disengages the first circuit means upon opening of the door.

* * * * *